June 4, 1968   JEAN-MARIE MASSOUBRE   3,386,487
TIRE CASING WITH REINFORCED SIDEWALLS
Filed Nov. 26, 1965

INVENTOR.
JEAN-MARIE MASSOUBRE
BY
Brumbaugh, Free, Graves & Donohue
his   ATTORNEYS 3,386,487
TIRE CASING WITH REINFORCED SIDEWALLS
Jean-Marie Massoubre, Clermont-Ferrand, France, assignor to Compagnie Generale des Etablissements Michelin raison sociale Michelin & Cie, Clermont-Ferrand, Puy-de-Dome, France
Filed Nov. 29, 1965, Ser. No. 510,183
7 Claims. (Cl. 152—361)

ABSTRACT OF THE DISCLOSURE

A pneumatic tire of the radial-cord type is provided with zones of transition between a tread rigidified by reinforcing cords crossing the radial cords and flexible sidewalls on either side of the tread. The zones of transition are defined by narrow plies in part overlapping the tread and in part extending beyond the tread.

---

Figure 1:
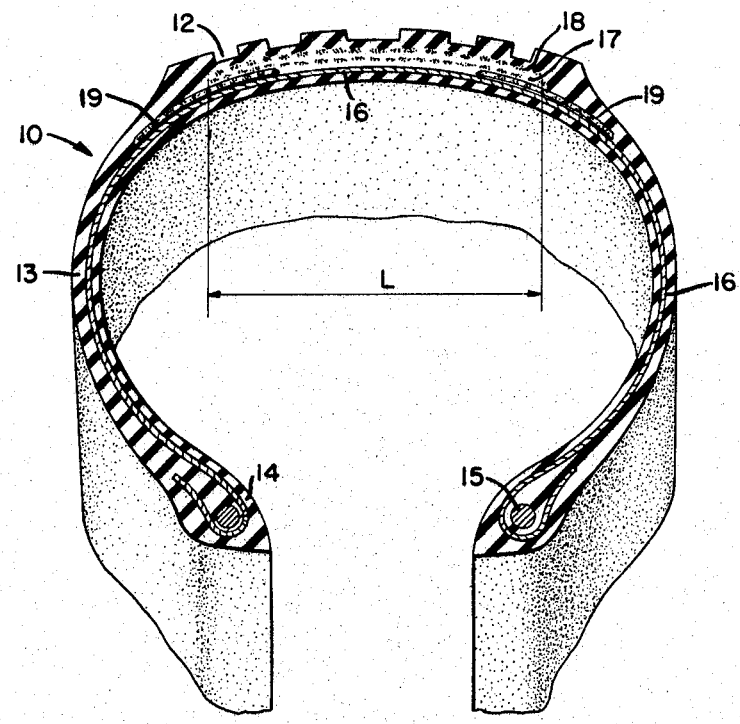

This invention relates to pneumatic tires and, more particularly, to pneumatic tires in which the casing is formed with radial cords and the tread is rigidified and stabilized by reinforcing cords crossing the radial cords.

An understanding of the invention and of the prior-art tire of which it is an improvement requires an understanding of the terms "cord" and "radial." As used herein, the term "cord" includes all filamentary materials, whether wires or assemblies of natural or synthetic fibers. Thus, the cords may be made of metal, glass, plastic, etc. The radial dimension of a tire is its dimension perpendicular to the tire axis. A radial cord is a cord lying in a plane containing the tire axis.

Although pneumatic tires of the type described above constituted an advance in the art at the time of their introduction, they display at high speeds certain undesirable properties. One such property is a tendency towards a rupture by centrifugal force of the bond between the tread-reinforcing cords and the surrounding rubbery composition in which they are embedded, especially at the end portions of the tread-reinforcing cords. As opposed to the radial cords of the tire body, which are anchored around the bead wires, those of the tread reinforcement have their end portions under the tread unsecured otherwise than to the surrounding rubbery composition, and separation of the wires from the rubbery composition may occur.

A second undesirable property of the prior-art tire is that the combination of flexible sidewalls reinforced solely by radial cords with a rigid and stable tread fails to inhibit sufficiently lateral movement of the sidewalls with respect to the tread. At high speeds this causes the vehicle on which the tires are mounted to sway transversely and give the passenger a feeling of decreased stability.

An object of the invention is to provide a pneumatic tire which overcomes the shortcomings of prior-art tires pointed out above.

In particular, an object of the invention is to provide a pneumatic tire in which the tread-reinforcing plies show reduced tendency to separate from the surrounding rubbery composition at high speeds and in which lateral movements of the sidewalls with respect to the tread are inhibited to the point where the vehicle on which the tires are mounted sways little at high speeds and gives the passengers in the vehicle a feeling of increased stability.

To this end, a tire constructed in accordance with the invention is provided in the area of each shoulder formed by the tread with the sidewalls with at least one narrow ply of cords located radially outside the radial cords and making with the radial cords angles within the range of about 40° to about 80° and preferably about 50° to about 70°. A portion of each narrow ply overlaps the tread-reinforcing cords and a portion of each narrow ply extends beyond the tread-reinforcing cords. The portion extending beyond the tread-reinforcing cords is preferably in close proximity to the radial cords.

Figure 2:
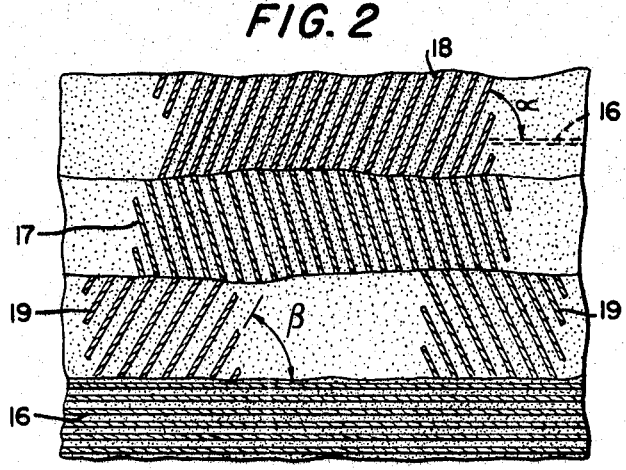

An understanding of further aspects of the invention may be obtained from a consideration of the following detailed description of a representative embodiment thereof in conjunction with the appended drawing, in which:

FIG. 1 is a perspective sectional view of a pneumatic tire constructed in accordance with the invention and FIG. 2 is a schematic sectional plan view of a portion of the tire of FIG. 1.

FIG. 1 shows a pneumatic tire 10 made of natural or synthetic rubber. The tire is formed with a grooved tread 12 and two sidewalls 13 each of which terminates in a bead portion 14 stiffened by a bead wire 15. The bead portion 14 may of course be further strengthened by flippers or other narrow plies of cords (not shown).

Each sidewall is reinforced by at least one ply of radial cords 16. The cords are radial in the sense that they run transversely from bead to bead in planes containing the axis of rotation of the tire. The ends of the radial cords are turned around the bead wires 15. The tread 12 is stabilized by a reinforcement made up of two tread-reinforcing plies 17 and 18 of cords laid at an angle alpha to the radial cords 16. The angle alpha may be, for example, 72°. The tread-reinforcing plies 17 and 18 have a width L which does not exceed the width of the tread.

In accordance with the invention, a narrow ply of calendered cords 19 is provided at each shoulder formed by the tread 12 with the sidewalls 13 of the tires. The narrow plies of cords 19 are radially outside the radial cords 16 in that the narrow plies of cords 19 lie farther from the axis of the tire than do the radial cords 16. In the embodiment illustrated, each narrow ply of cords 19 has a width of approximately 40 millimeters, which is about one-third the width L of the tread-reinforcing plies 17 and 18. The absolute width of each narrow ply of cords 19 is of course a function of the size of the tire. In a larger tire, such as one used on a typical "standard" size American automobile, the width of each narrow ply 19 may be greater than 40 millimeters.

In any case, the width of each narrow ply 19 should be between about 0.25 and 0.50 times the width of the tread reinforcement. The width of the portion of each narrow ply 19 lying beyond the tread reinforcement should be between 0.50 and 0.75 times the width of the narrow ply 19.

Thus, the plies 19 in part overlap and in part extend beyond the tread-reinforcing plies 17 and 18. The part extending beyond the tread-reinforcing plies 17 and 18 is preferably close to the ply of radial cords 16; i.e., is separated therefrom only by the usual rubber calendering of the cords.

The cords in the narrow plies 19 extend from lower left to upper right on the left side of FIG. 2 and from upper left to the lower right on the right side of the figure. The cords in the narrow plies 19 may, however, extend in the same direction. In any case, the cords in the narrow plies 19 make with the radial cords 16 at an angle beta of, for example, 65°. The angle beta should be not larger and is preferably smaller than the angle alpha referred to above. This helps to assure that the transverse stiffness of the area of the sidewall braced by the narrow plies 19 is well below the transverse stiffness of the reinforced tread.

The tread-reinforcing plies 17 and 18 are preferably made of steel and the cords of each narrow ply 19 of textile, particularly polyamide fibers. Thus, the cords of the plies 19 are more elastic than those of the tread reinforcement. This also helps to assure that the transverse stiffness of the area of the sidewalls braced by the narrow plies 19 is well below the transverse stiffness of the reinforced tread.

In the embodiment of FIG. 1, the narrow plies of cords 19 extend between the ply of radial cords 16 and the radially-inner tread-reinforcing ply 17. Alternatively, and also with good results, a portion of each narrow ply 19 may be inserted between the two tread-reinforcing plies 17 and 18 or even be disposed radially outside the radially-outer tread-reinforcing ply 18. In each of the embodiments, the portion of each narrow ply 19 located beyond the tread-reinforcing plies 17 and 18 preferably remains substantially adjacent to the radial cords 16.

Preferably only one narrow ply 19 is used on each side of the tread-reinforcing plies. In case, however, the tread reinforcement is made up of more than two plies of cords, two superimposed narrow plies 19 the cords of which cross each other may be provided in each shoulder area. In this case, one of them may be located between the radial cords 16 of the tire body and those of the tread reinforcement and the other be located either between any two successive plies of the tread reinforcement or radially outside the radially-outermost ply of the tread reinforcement. Again, the portion of each narrow ply 19 located beyond the tread reinforcement should be substantially adjacent to the radial cord 16.

The number of superimposed narrow plies 19, if more than one is used in each shoulder area, the angle formed by their cords with the radial cords 16 of the tire body, and the material of which they are made are selected so as to ensure that the transverse stiffness of the area of the sidewalls braced by these narrow plies 19 is well below the transverse stiffness of the reinforced tread.

Thus, there is provided in accordance with the invention a pneumatic tire having superior lateral stability or a reduced tendency toward lateral displacement of the sidewalls in the vicinity of the tread without a reduced radial or vertical flexibility. In addition, the tire exhibits less tendency for the ends of the tread-reinforcing cords to separate from the surrounding elastomer.

Those skilled in the art will readily understand that the specific embodiment disclosed herein is susceptible of considerable modification in form and detail within the spirit and scope of the invention. The disclosed embodiment is to be taken as illustrative only and the invention is to be construed as including all of the embodiments thereof falling within the scope of the appended claims.

I claim:

1. A pneumatic tire comprising (a) a casing having a pair of flexible sidewalls and a tread portion joined to and extending between said sidewalls, (b) a tread attached to said casing at said tread portion, the casing having radial cords and the tread having at least one ply of reinforcing cords crossing said radial cords to rigidify said tread portion, and (c) at least one narrow ply of cords radially outside said radial cords at each edge of said ply of reinforcing cords, the cords of each narrow ply forming with said radial cords angles within the range of about 40° to about 80° and said reinforcing cords forming with said radial cords angles at least as great as the angles formed by the cords of each narrow ply with said radial cords, one portion of each narrow ply overlapping said ply of reinforcing cords and another portion of each narrow ply extending beyond said ply of reinforcing cords.

2. A pneumatic tire according to claim 1 wherein said angles are within the range of about 50° to about 70°.

3. A pneumatic tire according to claim 1 in which each narrow ply is located close to said radial cords at least along said other portion of said narrow ply.

4. A pneumatic tire according to claim 1 in which the transverse stiffness of said tire in the vicinity of said one portion is substantially greater than the transverse stiffness of said tire in the vicinity of said other portion.

5. A pnematic tire according to claim 1 in which the width of each narrow ply is between about 0.25 and about 0.50 times the width of said ply of reinforcing cords.

6. A pneumatic tire according to claim 1 in which the width of said other portion of said narrow ply is between about 0.50 and about 0.75 times the width of said narrow ply.

7. A pneumatic tire comprising (a) a casing having a pair of flexible sidewalls and a tread portion joined to and extending between said sidewalls, (b) a tread attached to said casing at said tread portion, the casing having radial cords and the tread having at least one ply of reinforcing cords crossing said radial cords to rigidify said tread portion, and (c) at least one narrow ply of cords radially outside of said radial cords at each edge of said ply of reinforcing cords the cords of each narrow ply forming with said radial cords angles within the range of about 50° to about 70° and said reinforcing cords forming with said radial cords angles at least as great as the angles formed by the cords of each narrow ply with said radial cords, one portion of each narrow ply overlapping said ply of reinforcing cords and another portion of each narrow ply extending beyond said ply of reinforcing cords, each narrow ply being located close to said radial cords at least along said other portion, the transverse stiffness of said tire in the vicinity of said one portion being substantially greater than the transverse stiffness of said tire in the vicinity of said other portion, the width of each narrow ply being between about 0.25 and about 0.50 times the width of said ply of reinforcing cords, and the width of said other portion of each narrow ply being between about 0.50 and about 0.75 times the width of said narrow ply.

References Cited

UNITED STATES PATENTS

| | | | |
|---|---|---|---|
| 1,384,262 | 7/1921 | Landon | 152—361 X |
| 1,842,353 | 1/1932 | Lorentz | 152—361 |
| 3,095,027 | 6/1963 | Weber | 152—361 X |
| 3,195,604 | 7/1965 | Boussu et al. | 152—361 |

ARTHUR L. LA POINT, *Primary Examiner.*

DRAYTON E. HOFFMAN, *Examiner.*